Nov. 30, 1926.
E. J. MARTEL ET AL
1,608,948
AUTOMOBILE SIGNAL ACTUATING DEVICE
Filed June 15, 1922
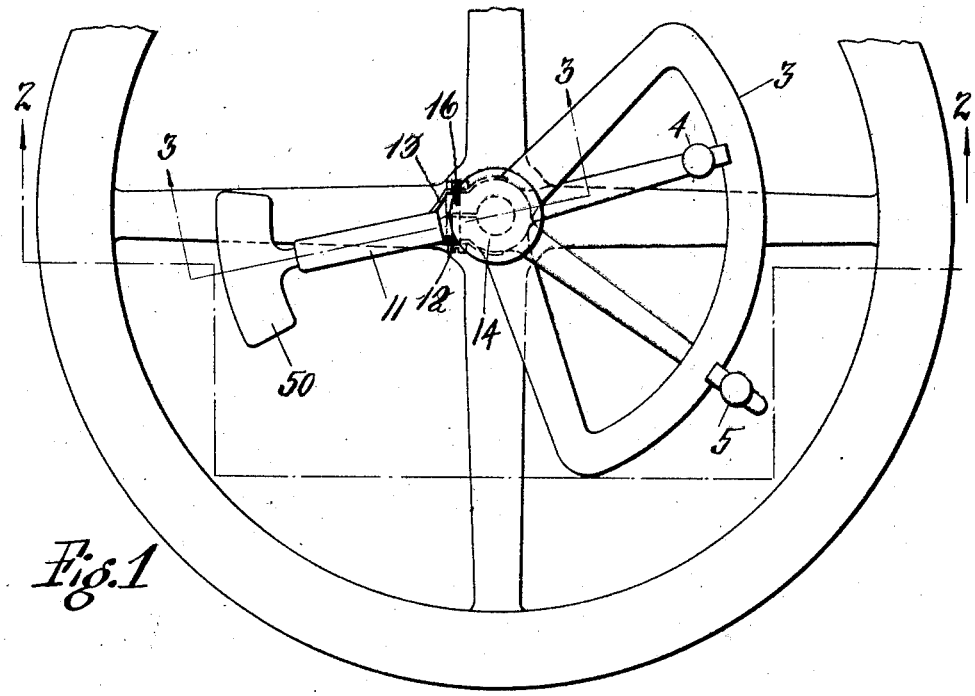
Fig.1
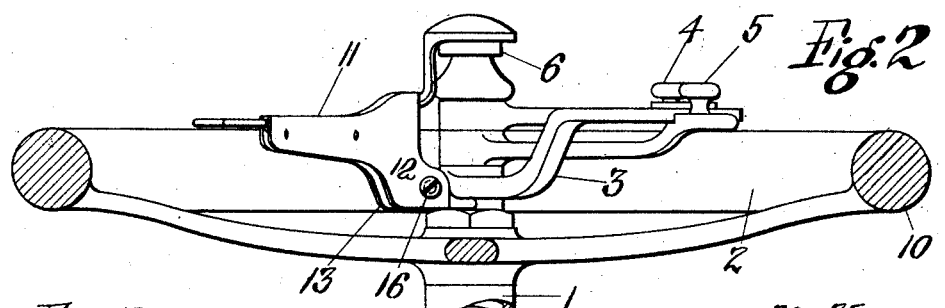
Fig.2
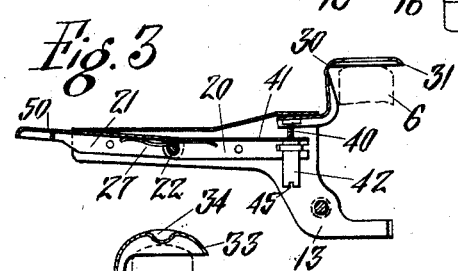
Fig.3
Fig.5
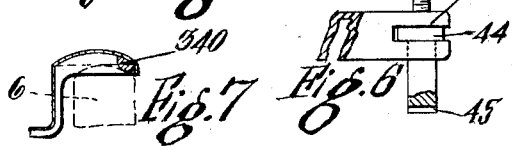
Fig.4
Fig.6
Fig.7
Inventors
Edgar J. Martel
Robert G. Sanders
Att'ys Patented Nov. 30, 1926.

1,608,948

UNITED STATES PATENT OFFICE.

EDGAR J. MARTEL AND ROBERT G. SANDERS, OF LACONIA, NEW HAMPSHIRE.

AUTOMOBILE SIGNAL-ACTUATING DEVICE.

Application filed June 15, 1922. Serial No. 568,636.

In several makes of automobiles the electric contact-making button for actuating the horn or other signal device is situated at the upper end of the steering post, and in order to reach this button it is necessary for the driver to release one hand from the steering wheel. In times of emergency it might be very desirable to apply the hand emergency brake and sound the signal simultaneously, but should this be done with the construction above described both hands would be removed from the steering wheel, thus permitting the course of the vehicle to be uncontrolled.

The present invention, therefore, eliminates this dangerous condition by providing a mechanism by which the button at the end of the steering post may be actuated without requiring the removal of the operator's hand from the steering wheel. The driver may thus control the course of the vehicle and sound the signal simultaneously with one hand, leaving the other free to actuate the hand brake, the gear shaft lever, or any other hand operated part, as may be desired. Not only does this invention permit simultaneous steering and signal actuation by one hand, but it places the signal actuator so convenient to the vehicle driver that no time is lost reaching for the actuating element when it is desired to sound the signal, and the operator is relieved from unnecessary exertion and may devote more nearly undivided attention to driving so that driving is made easier and safer.

More specifically this invention provides a device engageable over the signal button at the top of the steering column and having an element movable to actuate this button within reach of the thumb or finger of the driver's hand as it grasps the steering wheel. It is also so constructed that it does not interfere with the actuation of the signal by pressure exerted at the end of the steering column in the usual manner thus producing two actuating points either of which may be used at will as may be more convenient at the particular moment. It may be readily attached to the vehicle without requiring any modification in any part of the vehicle to receive it, and it is also readily adjustable to adapt it to vehicles of different makes and different individual characteristics.

For a more complete understanding of this invention together with further objects and advantageous details and combinations of parts, reference may be had to the accompanying drawings in which—

Figure 1 is a plan of the device as attached to a vehicle, showing the related positions of the steering wheel, and the spark and throttle lever segment.

Figure 2 is a section taken substantially on line 2—2 of Figure 1 showing the upper portion only of the steering post.

Figure 3 is a detail cross section on line 3—3 of Figure 1 showing a slight modification in the contact button engaging member.

Figure 4 is a sectional detail showing another form of contact button engaging element.

Figure 5 is a view similar to Figure 3, but showing certain modified constructions.

Figure 6 is a detail of an adjusting mechanism.

Figure 7 is a view similar to Figure 4 but showing another modification.

Referring more particularly to Figures 1 and 2, at 1 is shown the upper end of an automobile steering post having mounted thereon the usual steering wheel 2. Also carried stationarily on the steering post 1 is the usual segment 3 on which ride the control levers 4 and 5, which in the case of the usual internal combustion engine motor, control the throttle and spark. At the upper end of the steering post 1 in the axis of the steering wheel is positioned a signal-actuating button 6, the depression of which closes an electric circuit in the usual manner for the sounding of the horn or other signal. As this button is positioned centrally of the steering post it is out of reach of the operator's hand as it grasps the rim 10 of the steering wheel. The device of the present invention, therefore, comprises a support 11 which is shown in the form of a casing of inverted U shape in cross section which has suitable means at one end for attaching it rigidly to the upper end of the steering post. This means, as shown, comprises a pair of spaced arms 12 and 13 which may be formed integral with the casing and which extend on either side of a split collar 14 by which the quadrant 3 is made fast to the steering column. A clamping screw 16 may be employed passing through arms 12 and 13 and the free ends of the split collar to clamp both the segment and support 11 in position, as shown this being the only attaching means necessary, it being unnecessary to modify the steering post or other parts in any particular to receive this device. While as shown the casing 11 is attached to a portion of the quadrant, it might of course be attached to any other suitable stationary part of the steering mechanism where its operating members may be conveniently positioned to function in the required manner.

Referring more particularly to Figure 3, this casing carries pivoted therein a pair of levers shown at 20 and 21. The adjacent ends of these levers interengage, as for example, by means of a pin 22 passed transversely through one of these levers and engaging in a mating opening in the other lever, it being necessary, of course, to permit a slight lost motion, as by means of a slotted or enlarged opening through one or both of the levers and through which the pin 22 passes to permit rocking of the levers on their pivots. In Figure 5 a modified construction is shown in which the lever 20$^a$ is provided with an extension 25 overlying a similar extension 26 on the adjacent end of the lever 21$^a$. The adjacent ends of these levers are normally urged downwardly to urge their outer ends upwardly by any suitable means. In Figure 3 such a means comprises a spring 27 coiled about the pin 22 and bearing at opposite ends against the under faces of the levers 20 and 21. In the construction shown in Figure 5 a leaf spring 28 is made fast to the under side of the top portion of the casing 11 and bears at its free end against the extension 25. In both cases these springs are employed to urge the operating portions of the device into their normal inoperative positions.

The outer end of the lever 20 beyond the end of the casing 11 has fixed thereto a member 30 which bears across the end of the signal button 6. The portion of this member engaging the button may be of various forms, in Figure 3 it being shown at 31 as a ring, in Figure 4 as a cup shaped element 33 having a central depression 34 therein forming a signal button-engaging projection and in Figure 7 as a cup shaped element having a boss or nob 340 eccentrically disposed to act on one edge of the button. This latter construction is used where the signal actuating button is rocked or tilted rather than depressed in order to close the signal circuit. This member 30 is preferably attached to the lever 20 by means of an adjustable connection so that in the normal position of the device when the signal is not being sounded, the member 30 may exert no pressure against the button 6, but on depression thereof against the action of the spring 27 or 28 it immediately contacts therewith and depresses, or, in the construction of Figure 7, rocks the button to sound the signal. One method of forming this adjustable connection is shown in Figure 5 which comprises forming a portion of the member 30 with a series of perforations as 35 for the selective reception of pins, as 36, engaging through any of the perforations 35 and mating perforations in the lever 20$^a$.

A preferred construction, however, is indicated in Figures 3 and 6. As herein shown the member 30 has fixed to its lower end a screw 40 which projects through a perforation in the top portion 41 of the lever 20 which is preferably formed U-shaped in cross section. Beneath the portion 41, a nut 42 is threaded on the screw 40, and, in order to hold this nut against translation with capability of rotation relative to the lever 20, the side walls of this lever have slots as 43 formed therein in which engage a flange 44 extending outwardly from the nut 42. By turning of this nut the height of the member 30 relative to the lever may be adjusted, and in order that the nut may be readily manipulated it preferably is sufficiently long to extend beyond the lower end of the screw 40 and is provided in its lower end with a screw-driver receiving slot 45. With this construction a screw-driver may be inserted from beneath into the screwdriver slot 45 and the height of the button-engaging element 30 may be adjusted as required without removing the device from the steering post or requiring any disassembling of the device.

The lever 21 has attached or formed at its outer end an arcuate plate 50 which is positioned adjacent to the rim 10 of the steering wheel. This plate is of sufficient length so that the driver's thumb may readily find it when his hand is in position on the steering wheel, and by pressure thereon it is evident that the inner end of the lever 21 may be rocked upwardly against the spring 27 or 28 which acts to depress the button-engaging element 30 to sound the signal. It is also evident that pressure may be applied, if desired, against the member 30 substantially in the same manner as if the device were not in position, the motion being communicated directly to the signal button instead of being transmitted through the levers 20 and 21.

Having thus described certain embodiments of this invention it should be evident to those skilled in the art that many changes and modifications might be made therein without departing from its spirit or scope as defined by the appended claims.

We claim:

1. A device for actuating the signal button positioned at the upper end of a vehicle steering column having a steering wheel thereon, which comprises a member fixed at one end to said column and extending laterally therefrom toward the rim of said steering wheel, and a pair of inter-engaging levers pivoted to said member, one of said levers having an element engaging over said button, and the other of said levers having an actuating element positioned adjacent to the rim of said steering wheel.

2. A device for actuating a signal button positioned at the upper end of a vehicle steering column having a steering wheel thereon, which comprises a casing of inverted U-shape in cross section made fast at one end to said column and extending toward the rim of said wheel, a pair of levers pivoted between opposite sides of said casing and having their adjacent ends interengaging, a member engageable over said button fixed to the other end of one of said levers, and an actuating member at the other end of the other lever beyond the end of said casing and adjacent to the rim of said steering wheel.

3. A device for actuating a signal button positioned at the upper end of a vehicle steering column having a steering wheel thereon, which comprises a casing of inverted U-shape in cross section made fast at one end to said column and extending toward the rim of said wheel, a pair of levers pivoted between opposite sides of said casing and having their adjacent ends interengaging, a member engageable over said button fixed to the other end of one of said levers, an actuating member at the other end of the other lever beyond the end of said casing and adjacent to the rim of said steering wheel, and resilient means urging said button-engaging member to relieve pressure on said button.

4. A device of the class described comprising a support attachable in a fixed position adjacent to a steering wheel, a pair of levers pivoted to said support with their adjacent ends interengaging, a member adjustably fixed to the outer end of one of said levers and engageable over a signal button, and an arcuate actuating element at the outer end of the other of said levers adjacent to the rim of the steering wheel.

5. A device of the class described comprising a casing of inverted U-shape in cross section attachable at one end adjacent to a steering wheel, a lever pivoted in said casing, a cap engageable over a signal actuating button positioned in the axis of said wheel, and an adjustable connection between said lever and cap accessible for adjustment from the open side of said casing.

6. A device of the class described comprising a member constructed to engage over a push button, an actuating member, a screw held by one of said members, and a nut engaging said screw and carried by the other of said members, said nut being rotatable but held against translation relative to said other member to permit the adjustment of said first mentioned member over said button.

7. A device of the class described comprising a member constructed to engage over a push button, an actuating member, a screw fixed to one of said members, and a nut rotatably held by the other of said members and engaging said screw.

8. A device of the class described comprising a member constructed to engage over a push button, an actuating member, a screw fixed to one of said members, and a nut rotatably held by the other of said members and engaging said screw, said nut being constructed for engagement by a tool by which it may be turned.

9. A device of the class described comprising a member constructed to engage over a push button, an actuating member U-shape in cross section, the sides of said member having opposed slots therethrough, a screw fixed to said button-engaging member and passing through said actuating member between said slots, and a nut engaging said screw, said nut having a flange seated in said slots to rotatably retain it in position on said actuating member.

10. A device of the class described comprising a member constructed to engage over a push button, an actuating member U-shape in cross section, the sides of said member having opposed slots therethrough, a screw fixed to said button-engaging member, and a nut engaging said screw, said nut having a flange seated in said slots to rotatably retain it in position on said actuating member, and the outer end of said nut having a screw-driver slot therein.

11. A device of the class described comprising a casing, a lever pivoted in said casing, a circuit closer engaging member fixed to one end of said lever, a second lever pivoted in said casing and having one end in engagement with the other end of said first lever, an actuating element carried by said second lever, and a spring acting on the engaging ends of said levers, urging said closer engaging member to inoperative position.

12. In combination with a circuit closer comprising a button rockable to close the circuit, of a cap having an element eccentrically engaging said button, and means for depressing said cap.

13. In combination with a circuit closer comprising a button rockable to close the circuit, of an element eccentrically engaging the end of said button, and means for depressing said element.

14. In combination with a vehicle steering column having a steering wheel thereon, of a casing fixed to said column, a lever pivoted in said casing and accessible for actuation adjacent to the rim of said wheel, and means actuable by the rocking of said lever for closing a circuit.

In testimony whereof we have affixed our signatures.

EDGAR J. MARTEL.
ROBERT G. SANDERS.